L. C. EMERSON.
NUT LOCK.
APPLICATION FILED MAR. 12, 1912.

1,068,488.

Patented July 29, 1913.

Witnesses

Inventor,
Loender C. Emerson,
per James T. Barkelew
his Attorney.

UNITED STATES PATENT OFFICE.

LOENDER C. EMERSON, OF LOS ANGELES, CALIFORNIA, ASSIGNOR OF ONE-THIRD TO WILLIAM W. BLAKESLEE, OF LOS ANGELES, CALIFORNIA.

NUT-LOCK.

1,068,488.  Specification of Letters Patent.  Patented July 29, 1913.

Application filed March 12, 1912. Serial No. 683,215.

*To all whom it may concern:*

Be it known that I, LOENDER C. EMERSON, a citizen of the United States, residing at Los Angeles, in the county of Los Angeles, State of California, have invented new and useful Improvements in Nut-Locks, of which the following is a specification.

This invention relates to a nut lock of that general class wherein the nut is held from rotation directly with relation to the body upon which it is screwed down; and the prime object of this invention is to provide a simple mechanism by means of which a nut may be locked accurately in any position to which it is turned, without the necessity of being turned to a predetermined point to allow a ratchet or the like to operate against unscrewing.

My present invention consists fundamentally in the provision of a suitable washer between the nut and the body on which it is adapted to be screwed down, there being means provided to rotatively lock the nut and washer together. This means may be of any desired nature; and I have adopted a particular method which appears simple and reliable. The washer is secured against rotation on the face of the said body by a peculiar and simple arrangement which is the basis of my invention. An aperture is formed in the body directly beneath the edge of the washer, preferably so that a portion of the aperture is visible beyond the periphery of the washer but so that the major part of the aperture comes beneath the washer. The washer is supplied plain; that is, it has no projections of any character which will engage with the aperture. But when the nut is screwed down tightly to its final position, then the washer is secured from rotation by means of turning down a small portion of its periphery into the aperture.

In the accompanying drawings I have shown a preferred form of my invention.

Figure 1:
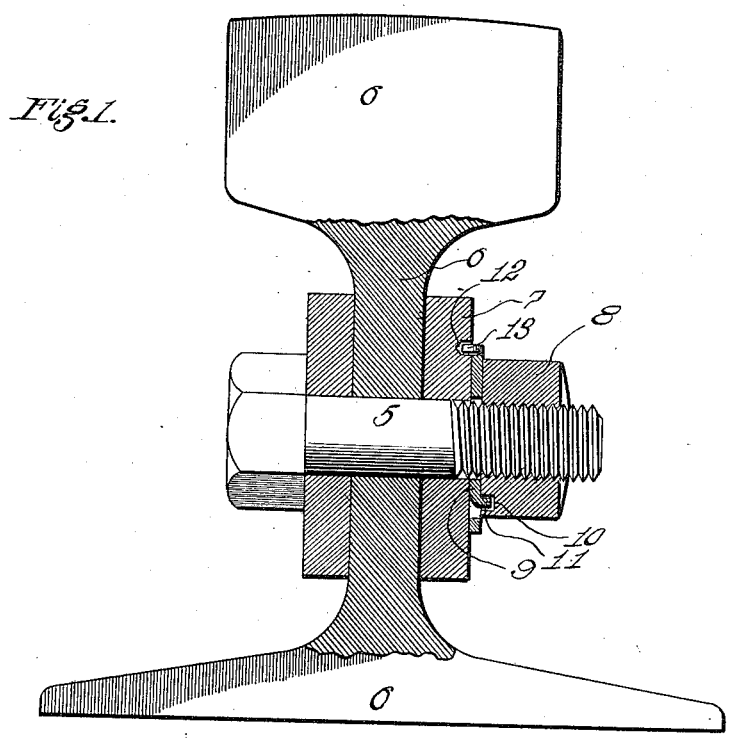
Figure 2:
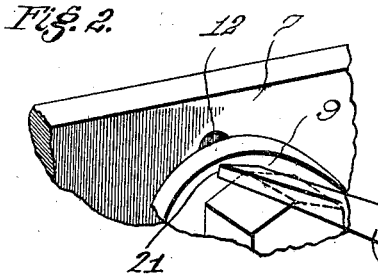
Figure 3:
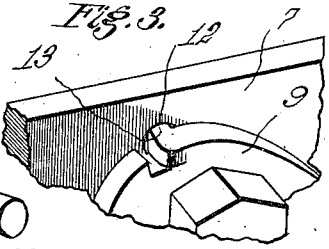
Figure 4:
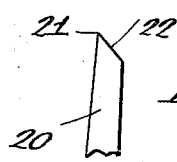

Figure 1 is a sectional view showing my invention in use on a rail joint. Fig. 2 is a perspective detail showing the first stage of the application of my nut lock. Fig. 3 is a perspective detail showing the second stage of the application of my nut lock. Fig. 4 shows a tool used in applying my nut lock.

In the drawings 5 designates a bolt which may pass through any material and be used in any common method for fastening. I have shown this bolt 5 as passing through a rail 6 and securing plate 7. The nut 8 of the bolt is normally adapted to screw down on to the plate 7 and to thereby tightly secure the plate and the rail together; but in my construction the washer 9 is interposed. The nut is rotatively attached to the washer by any convenient means. I have preferably shown an aperture 10 in the under face of the nut and a struck out portion 11 of the washer 9 which enters the aperture 10. This provides that the nut 8 cannot turn without rotating the washer. The nut and washer are first screwed down on the plate 7 as tightly as desired. The washer is perfectly plain with the exception of the struck out portion 11. This step of the operation is clearly shown in Fig. 2. An aperture 12 is provided directly beneath the peripheral portion of the washer 9, a small part of the aperture 12 preferably appearing outside the edge of the washer, so that the position of the aperture may be known. When the nut has been tightly screwed down, a conveniently shaped tool (a chisel of some sort) is taken and the periphery of the washer cut as is shown in Fig. 3 and the severed portion 13 bent down into the aperture 12. Such a tool is illustrated in Figs. 2 and 4 at 20; having a cutting edge 21 which severs the portion 13 from the washer along a radial line, and having surface 22 which forces the cut portion into the shape shown in Fig. 3.

My invention provides simple means for locking a washer in position after the nut has been screwed tightly down to any desired position; and it is my specific means that I wish to secure by the following claim.

Having described my invention, I claim:

A nut lock comprising in combination a nut and bolt and a body portion through which said bolt passes, said body portion having a facial recess formed therein and outside of the path of the nut, a washer located between said body portion and said nut, said recess lying partly beneath said washer and partly beyond the edge thereof, said nut and washer being provided with means for causing them to turn together, and said washer adapted to have a tongue cut and bent therefrom at a single operation after the washer is applied to a position substantially at right angles to the body of the washer and into engagement within said recess, the walls of said recess lying substantially at right angles to the face of said body portion.

In witness that I claim the foregoing I have hereunto subscribed my name this 6th day of March 1912.

LOENDER C. EMERSON.

Witnesses:
WILLIAM W. BLAKESLEE,
JAMES T. BARKELEW.

Copies of this patent may be obtained for five cents each, by addressing the "Commissioner of Patents, Washington, D. C."